(12) United States Patent
Banow et al.

(10) Patent No.: US 12,355,888 B2
(45) Date of Patent: *Jul. 8, 2025

(54) VALIDATIONS USING VERIFICATION VALUES

(71) Applicant: Visa International Service Association, San Francisco, CA (US)

(72) Inventors: Sheldon Banow, Castro Valley, CA (US); Eduardo Lopez, Menlo Park, CA (US); Sayeed Mohammed, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/610,951

(22) Filed: Mar. 20, 2024

(65) Prior Publication Data
US 2024/0235838 A1 Jul. 11, 2024

Related U.S. Application Data

(63) Continuation of application No. 17/580,563, filed on Jan. 20, 2022, now Pat. No. 11,973,871.

(51) Int. Cl.
*H04L 9/32* (2006.01)
(52) U.S. Cl.
CPC .................. *H04L 9/3213* (2013.01)
(58) Field of Classification Search
None
See application file for complete search history.

(56) References Cited

U.S. PATENT DOCUMENTS

| | | | |
|---|---|---|---|
| 7,891,560 B2 | 2/2011 | Hammad | |
| 9,996,835 B2 | 6/2018 | Dill et al. | |
| 10,491,389 B2 | 11/2019 | Girish et al. | |
| 10,552,834 B2 | 2/2020 | Dimmick et al. | |
| 2016/0019536 A1 | 1/2016 | Ortiz et al. | |
| 2016/0105469 A1* | 4/2016 | Galloway | H04L 69/16 709/231 |

(Continued)

OTHER PUBLICATIONS

U.S. Appl. No. 17/580,563, "Notice of Allowance", Dec. 21, 2023, 12 pages.

*Primary Examiner* — Anh Nguyen
(74) *Attorney, Agent, or Firm* — Kilpatrick Townsend & Stockton LLP

(57) ABSTRACT

A method is disclosed, and includes receiving from a token requestor, a token data request message comprising an initial resource provider identifier, and determining a permanent resource provider identifier using the initial resource provider identifier. The method also includes determining a verification value, and associating the permanent resource provider identifier with a token, the verification value. The method also includes providing a token data response message including a verification value to the token requestor, receiving an authorization request message comprising the token, the verification value, and one or more data elements in a plurality of data fields, determining the permanent resource provider identifier using the one or more data elements in the plurality of data fields, and determining that the verification value in the authorization request message matches the verification value that was provided to the token requestor.

20 Claims, 11 Drawing Sheets

(56) References Cited

U.S. PATENT DOCUMENTS

| | | |
|---|---|---|
| 2016/0232525 A1 | 8/2016 | Cateland |
| 2016/0321652 A1* | 11/2016 | Dimmick .............. H04L 63/083 |
| 2020/0034818 A1 | 1/2020 | Selfin et al. |
| 2021/0051012 A1 | 2/2021 | Law |
| 2021/0295280 A1* | 9/2021 | Blakesley ............ G06Q 20/385 |
| 2021/0312448 A1 | 10/2021 | Kinagi |
| 2021/0368012 A1 | 11/2021 | Kumnick |

* cited by examiner

VALIDATIONS USING VERIFICATION VALUES

CROSS-REFERENCES TO RELATED APPLICATIONS

This application is a continuation application of U.S. patent application Ser. No. 17/580,563, filed on Jan. 20, 2022, which is herein incorporated by reference in its entirety.

BACKGROUND

Access transactions such as transactions to access secure locations, payment transactions, and transactions to obtain secure data can utilize tokens to protect sensitive information such as credentials. Such credentials may include payment credentials, secure access credentials, etc.

When a token is used, it can be included in authorization request message, which can request authorization to access a particular resource provided by a resource provider. A cryptogram may accompany the token and the cryptogram may encode information regarding the use of the token. For example, a cryptogram may encode information regarding a particular period of time in which the use of the token may be valid, the particular resource providers for which the token can be used, etc. Because the cryptograms can encode such information, they can be long and/or of varying length. As such, it is difficult to use existing cryptograms in standardized data fields of specific lengths. As a result, existing tokens and their associated cryptograms may not be suitable for use in standardized data fields on user interfaces on Websites or applications.

Another problem with exists with conventional systems is that they must be specifically programmed in order to use the long or specialized cryptograms that are described above. Thus, only a select number or type of resource provider can use the long or specialized cryptograms and obtain the benefits thereof.

Embodiments of the disclosure address this problem and other problems individually and collectively.

SUMMARY

One embodiment of the invention includes a method. The method comprises: receiving, at a processing system comprising a token service computer from a token requestor, a token data request message comprising an initial resource provider identifier associated with a resource provider operating a resource provider computer; determining, by the processing system, a permanent resource provider identifier using the initial resource provider identifier; responsive to determining the permanent resource provider identifier, determining, by the processing system, a verification value; associating, by the processing system, the permanent resource provider identifier with a token, the verification value; providing, by the processing system, a token data response message comprising a verification value to the token requestor; receiving, by the processing system, an authorization request message for a transaction, the authorization request message comprising the token, the verification value, and one or more data elements in a plurality of data fields; determining, by the processing system, the permanent resource provider identifier using the one or more data elements in the plurality of data fields; determining, by the processing system, that the verification value in the authorization request message matches the verification value that was provided to the token requestor; and transmitting, by the processing system, an authorization response message to the resource provider computer.

Another embodiment of the invention includes a processing system comprising: one or more processors; and one or more non-transitory computer readable media, comprising code, executable by the one or more processors, to implement a method comprising: receiving, from a token requestor, a token data request message comprising an initial resource provider identifier associated with a resource provider; determining a permanent resource provider identifier using the initial resource provider identifier; responsive to determining the permanent resource provider identifier, determining a verification value; associating the permanent resource provider identifier with a token, the verification value; providing a token data response message comprising a verification value to the token requestor; receiving an authorization request message for a transaction, the authorization request message comprising the token, the verification value, and one or more data elements in a plurality of data fields; determining the permanent resource provider identifier using the one or more data elements in the plurality of data fields; determining that the verification value in the authorization request message matches the verification value that was provided to the token requestor; and transmitting an authorization response message to the token requestor.

Another embodiment of the invention includes a method. The method comprises: providing, by a token requestor to a processing system comprising a token service computer, a token data request message comprising an initial resource provider identifier associated with a resource provider, wherein the processing system determines a permanent resource provider identifier using the initial resource provider identifier and a verification value, and associates the permanent resource provider identifier with a token, the verification value; receiving, by the token requestor from the processing system a token data response message comprising a verification value to the token requestor; and providing, by the processing system, the token and the verification value to a resource provider computer associated with the initial resource provider identifier, wherein the resource provider computer transmits an authorization request message for a transaction to the processing system, the authorization request message comprising the token, the verification value, and one or more data elements in a plurality of data fields, wherein the processing system determines the permanent resource provider identifier using the one or more data elements in the plurality of data fields, determines that the verification value in the authorization request message matches the verification value that was provided to the token requestor.

These and other embodiments of the invention are described in further detail below.

DETAILED DESCRIPTION

Figure 1:
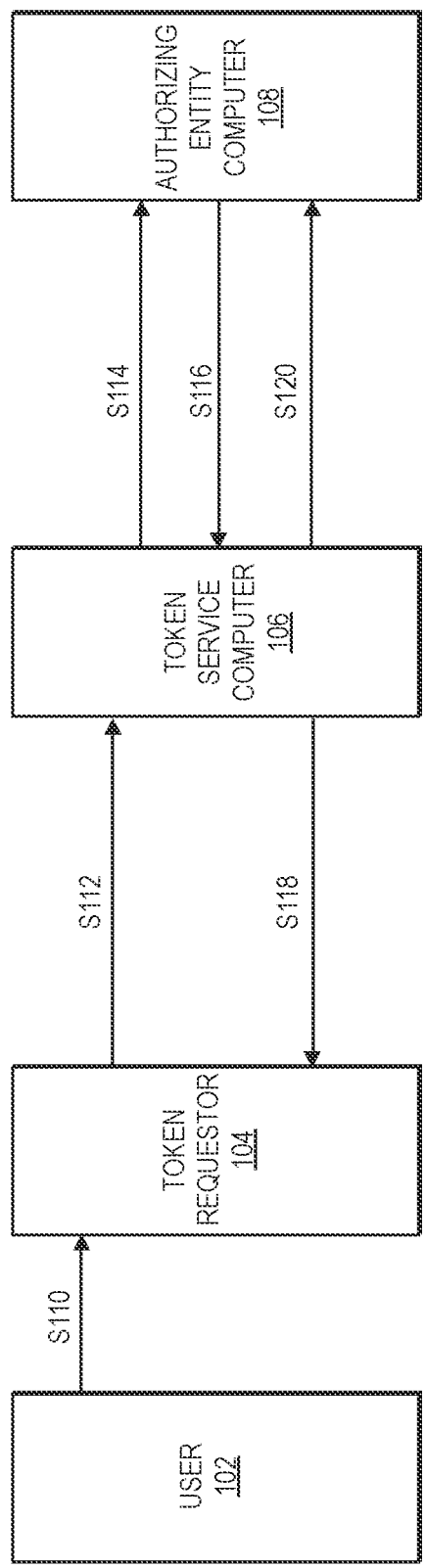
FIG. 1 shows a block diagram of a system according to an embodiment, with a flow diagram illustrating a token being provisioned by a token service computer.

Prior to discussing embodiments of the disclosure, some terms can be described in further detail.

A "user" may include an individual. In some embodiments, the user may be a cardholder, account holder, or consumer.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. An interaction can include a transaction interaction, a data transfer interaction, an access interaction, etc.

"Interaction data" can include data related to and/or recorded during an interaction. Interaction data can include an amount, a date, a time, a resource identifier, a resource provider identifier, a user identifier, credentials, and/or additional data relating to an interaction between a user and a resource provider.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may be a transfer application.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), username, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "token reference identifier" may include an identifier that can identify token, but is not the actual token itself. A token reference identifier may be used to identify a particular token. For example, a token such as 4000 8198 8298 1132 may be represented by a token reference identifier such as XP28278978. In embodiments of the invention, the token reference identifier cannot be used to conduct a transaction, but can serve as a security mechanism to allow different entities to take action with respect to the account without using the actual token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token requestor" may be any suitable entity that requests a token or data associated with the token. A token requestor can be a browser, a resource provider operating a resource provider computer, a user device, a user device operating a browser, etc.

A "cryptogram" may include a piece of obscured text such as encrypted text. A cryptogram may be formed by encrypting input data with an encryption key such as a symmetric encryption key. In some embodiments, a cryptogram can be reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

An "authorization request message" may be a message to request authorization for a transaction. An authorization request message according to some embodiments may comply with (International Organization of Standardization) ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, a PIN number, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be a message reply to an authorization request message. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "authorizing entity" may be an entity that authorizes a request. Examples of an authorizing entity may be an issuer, a governmental agency, a document repository, an access administrator, etc.

"Provisioning" may include a process of providing data for use. For example, provisioning may include providing, delivering, or enabling a token on a communication device. Provisioning may be completed by any entity within or external to the transaction system. For example, in some embodiments, tokens may be provisioned by an issuer or a transaction processing network onto a mobile device. The provisioned tokens may have corresponding token data stored and maintained in a token vault or token registry. In some embodiments, a token vault or token registry may generate a token that may then be provisioned or delivered to a device. In some embodiments, an issuer may specify a token range from which token generation and provisioning can occur. Further, in some embodiments, an issuer may generate and notify a token vault of a token value and provide the token record information (e.g., token attributes) for storage in the token vault.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "verification value" may be a value that can be used to verify something. In some embodiments, a verification value can be in the form of a cryptogram. In other embodiments, the verification value can be a random or pre-assigned value that is not an encrypted value. In some embodiments, the verification value has fewer digits than a conventional TAVV (token authentication verification value) and may only have three digits.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a system according to an embodiment of the invention along with a token provisioning process. The system comprises a token requestor 104 in communication with a token service computer 106. The token requestor 104 can be a browser that is present on a user device (not shown). The token service computer 106 can be in communication with an authorizing entity computer 108. The authorizing entity computer 108 may be operated by an authorizing entity such as an issuer. A user 102 may interact with the token requestor 104.

Figure 2:
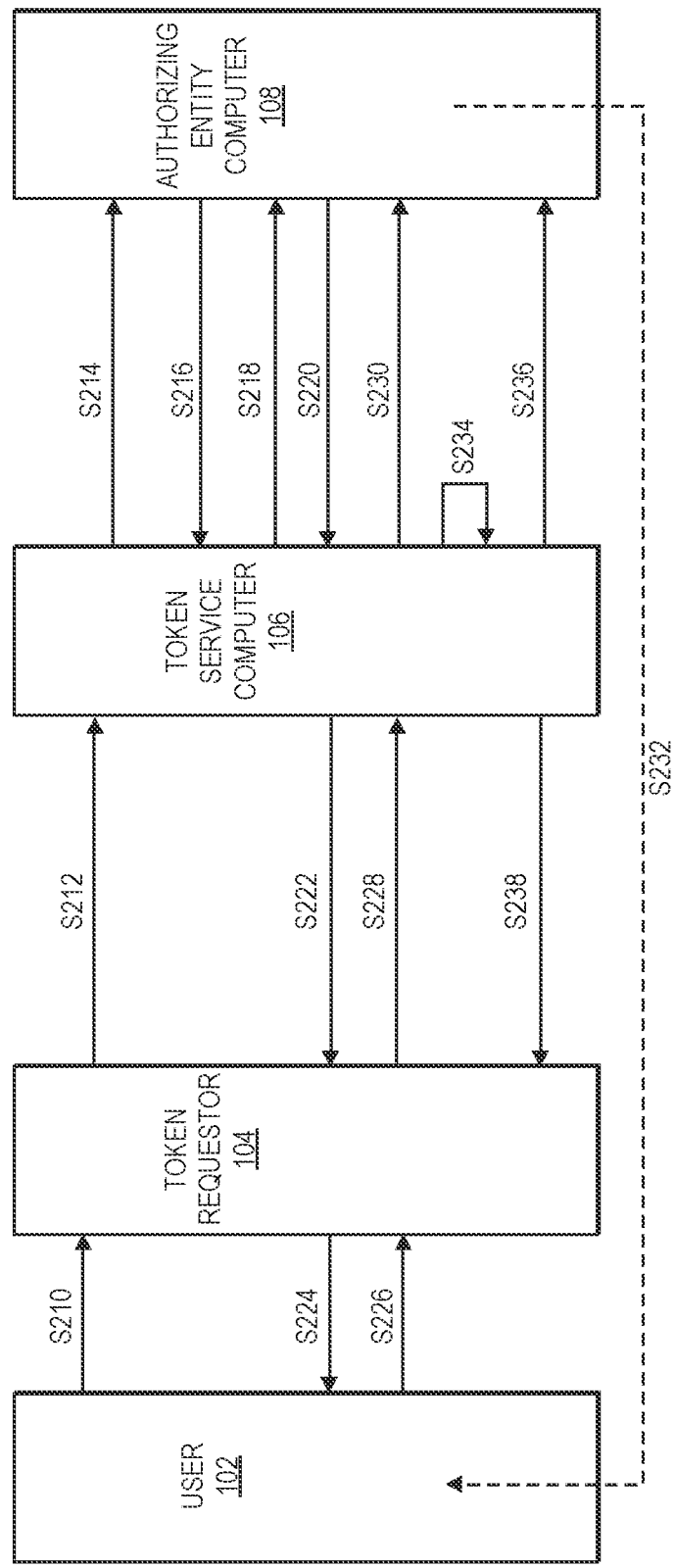
FIG. 2 shows a block diagram of a system according to an embodiment, with a flow diagram illustrating a token being bound to a user device.
Figure 3:
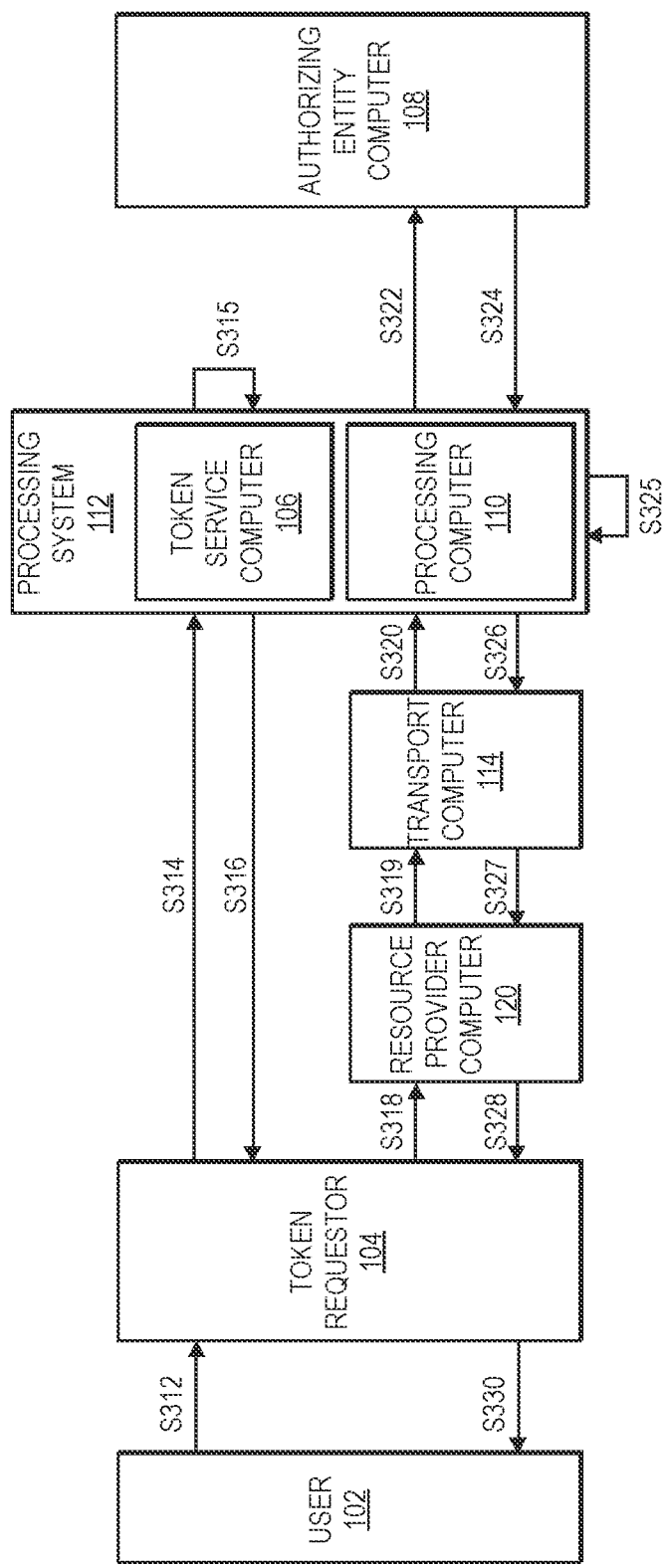
FIG. 3 shows a block diagram of a system according to an embodiment, with a process flow that provides a verification value in a transaction.

For simplicity of illustration, a certain number of components are shown in FIG. 1 (as well as FIGS. 2-3). It is understood, however, that embodiments of the invention may include more than one of each component. In addition, some embodiments of the invention may include fewer than or greater than all of the components shown in FIG. 1 (as well as FIGS. 2-3).

Messages between at least the devices of the system in FIG. 1 (as well as FIGS. 2-3) can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may in some instances, comprise a secure communication channel, which may be established in any known manner, such as through the use of mutual authentication and a session key, and establishment of a Secure Socket Layer (SSL) session.

In step S110, the user 102 can add a credential (e.g., a primary account number) to the token requestor 104, which as noted above, may be a browser on a user device operated by the user 102. The token requestor 104 may save the credential after the user adds the credential to it. This action may take place when the user 102 is conducting a transaction with a host site (e.g., a Web site) (not shown) on a resource provider computer (not shown) operated by a resource provider such as a merchant. The token requestor 104 may be browser which displays a checkout page on a merchant website after the user has selected a number of items to purchase on the website.

In step S112, after saving the credential, the token requestor 104 sends a token provision request to the token service computer 106. The token provision request requests that a token be provided to the token requestor 104. The token provision request may comprise the credential which was saved to the token requestor 104. The token provision request may be sent by a back end server associated with the token requestor 104 in a batch process or individually.

In step S114, after receiving the token provision request, the token service computer 106 sends a token activation request to the authorizing entity computer 108. The authorizing entity computer 108 may use any suitable criteria to determine whether or not to provision the token. For example, the authorizing entity computer 108 can determine if the credential is associated with an account that is in good standing and/or is otherwise free of potential fraudulent activity.

In step S116, upon a successful validation, the authorizing entity computer 108 sends a token activation response to the token service computer 106. The token activation response may comprise an indictor which indicates that the authorizing entity either approves or does not approve of the provisioning request.

After receiving the token activation response from the authorizing entity computer 108, the token service computer 106 may determine a token. The token may be determined by generating the token based upon pre-determined data inputs (e.g., the credential, dynamic data such as a counter, an authorizing entity cryptographic key, etc.). In other embodiments, the token may be obtained from a pre-existing pool of tokens previously created by the token service computer 106 or the authorizing entity computer 108.

In some embodiments, a token reference identifier may be created by the token service computer 106 in conjunction with the determined token. The token may be stored by the token service computer 106 for later retrieval. The token reference identifier may then be sent to the token requestor 104 instead of the actual token. Although the token reference identifier is sent to the token requestor 104, this process may still be referred to as "provisioning the token" to the token requestor 104. This is because the token requestor 104 can use the token to conduct future interactions, even though it does so through the use of a token reference identifier.

In step S118, the token service computer 106, upon a valid token activation response, provisions the token (or the token reference identifier) to the token requestor 104, which can then store the token (or the token reference identifier).

In step S120, the notification of the token being provisioned is sent to the authorizing entity computer 108.

FIG. 2 shows a system and a process for binding a user device to a particular token or token reference identifier. Similar to FIG. 1, the system in FIG. 2 shows a user 102, a token requestor 104, a token service computer 106, and an authorizing entity computer 108. In this example, the token requestor 104 may again be a browser on a user device operated by the user 102.

In step S210, the user 102 may provide a confirmation to the token requestor 104 that the user 102 agrees to bind the previously provisioned token to the particular user device that the user 102 is currently using. In some embodiments, the confirmation of binding the token to the user device may be implied and may occur when the token requestor 104 received the token or token reference identifier in the process described above with respect to FIG. 1.

In step S212, after receiving the confirmation from the user 102 to bind the token to the user device, the token requestor 104 sends a binding request to the token service computer 106. If the user device is not yet enrolled with the token service computer 106, the token requestor 104 can then send a request to enroll the user device to the token service computer 106. The request to enroll may comprise device data such as a user device identifier (e.g., a phone number, IMEI number, etc.) associated with the user device, as well as the previously described token reference identifier or token. The token service computer 106 may enroll the user device by storing the received device data (e.g., a device ID) associated with the user device associated with the token requestor 104 in a database along with the token reference identifier, the token, and the credential associated with the token and the token reference identifier.

In step S214, after receiving the binding request from the token requestor 104, the token service computer 106 then sends the binding request to the authorizing entity computer 108.

In step S216, upon receiving the binding request, the authorizing entity computer 108 sends a binding response with an indication that a step-up authentication process is to be performed.

In step S218, after receiving the step-up authentication request from the authorizing entity computer 108, the token service computer 106 requests a list of authentication methods that can be performed by the authorizing entity computer 108. Such authentication methods may include authentication via a PIN (personal identification number), password, biometric, etc.

In step S220, after receiving the request for the list of authentication methods, the authorizing entity computer 108 sends the list of authentication methods to the token service provider computer 106.

In step S222, the token service computer 106 sends the list of authentication methods to the token requestor 104. This list is then presented to the user 102 operating the user device.

In steps S226, S228, and S230, the user 102 selects an authentication method, and the selected authentication method is provided to the authorizing entity computer 108 via the token requestor 104 and the token service computer 106.

In step S232, after receiving the selected authentication method, the authorizing entity computer 108 authenticates the user 102 according to the selected authentication method.

In step S234, after successfully authenticating the user 102, the token service computer 106 binds the token and/or the token reference identifier to the user device.

In step S236, once the token and/or the token reference identifier is bound to the user device, a notification of the successful binding is sent to the authorizing entity computer 108.

In steps S238 and S240, the notification of the successful binding is sent from the token system computer 106 to the token requestor 104, and is provided to the user 102.

FIG. 3 shows a system comprising a user 102 that interacts with a token requestor 104. The token requestor 104 may be a browser operating on a user device. In some embodiments, the user 102 can use the browser to visit a host site (e.g., a Web site) that is operated by a resource provider computer 120 (e.g., a merchant computer). The token requestor 104 can be in communication with a processing system 112, which may include a token service computer 106 and a processing computer 110. The processing system 112 may be in communication with an authorizing entity computer 108, as well as a transport computer 114. The token requestor 104 can communicate with a resource provider computer 120, which in turn communicates with a transport computer 114.

The processing computer 110 can perform processing such as authorization processing and settlement processing. The processing computer 110 may include data processing subsystems, networks, and operations used to support and deliver authorization services, exception file services, and clearing and settlement services. For example, the processing computer 110 may comprise a server coupled to a network interface (e.g., by an external communication interface), and databases of information. The processing computer 110 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The processing computer 110 may use any suitable wired or wireless network, including the Internet.

In step S312, the user 102 may conduct a transaction (e.g., a payment transaction) with a host site of a resource provider operating a resource provider computer 120. Instead of manually entering a credential or token into a data field on the token requestor 104, the user 102 may select an auto form fill feature on the token requestor 104. The auto form fill feature may automatically fill in data fields on the token requestor 104 using data that has been saved or retrieved by the token requestor 104. For example, the token requestor 104 can be a browser, which may display a checkout page of a merchant Website. The browser may automatically detect payment information data fields for an account number, an expiration date, and a CVV2 code, and may auto-fill one or more of those payment information data fields with previously stored data.

In some embodiments, before the data fields in the token requestor 104 are auto-filled with saved data, the user 102 may be required to authenticate himself to the token requestor 104. For example, if the token requestor 102 is a browser, the token requestor may have previously stored authentication data such as a PIN, password, or biometric with the browser. The user 102 may be required to provide the correct authentication data to the browser before any payment information data fields are auto-filled with stored payment data (e.g., account numbers, tokens, etc.).

In step S314, once the token requestor 104 has authenticated the user 102, in some embodiments, the token requestor 104 sends a token data request message comprising an initial resource provider identifier, and also a token reference identifier or a token, and optionally user device data, to the token service computer 106 in the processing system 112. The initial resource provider identifier may be associated with a resource provider operating a resource provider computer. In some embodiments, the initial resource provider identifier may be a merchant URL, and may be used to identify a permanent resource provider identifier. In this example, the permanent resource provider identifier may be a string of characters that uniquely represents the resource provider. For example, the permanent resource provider identifier can be a merchant identifier such as "Macys12345." The token data request message may be a request for token data to populate the data fields in the token requestor 104 with token data. Such token data could include a verification value and a token (if a token reference identifier was sent in the token data request message), and possibly a token expiration date.

After the token service computer 106 receives the token data request message from the token requestor 104, the token service computer 106 can parse the data in the token data request message. The token service computer 106 can then check the device data (e.g., a user device identifier) for the user device in the token data request message to determine if it matches any previously stored device data obtained in a prior user device binding process. If the user device that is used to perform the transaction has been validated, then the token service computer 106 can determine the token corresponding to the token reference identifier in the token data request message (if the token reference identifier was sent in the token data request message).

The token service computer 106 can then determine a permanent resource provider identifier from the initial resource provider identifier. In some embodiments, the initial resource provider identifier is the same as the permanent resource provider identifier. In this example, the token data request message could contain an initial resource provider identifier such as "Macys1234." After receiving the token data request message, the token service computer 106 could determine that the initial resource provider identifier, "Macys1234" is the same as the permanent resource provider identifier. In other embodiments, the initial resource provider identifier could be a URL of a resource provider such as Macy's™. The URL may be linked to a permanent resource provider identifier such as "Macys1234." In yet another example, the initial resource provider identifier may be a URL such as "www.macys.com." However. this resource provider may not have previously enrolled with the token service computer 106. In this case, the token service computer 106 can generate a permanent resource provider identifier such as "Macys1234" after it determines that this is the first time that it will receive a transaction from "www.macys.com."

In some embodiments, the processing system 112 may have a global resource provider repository (e.g., a global merchant repository) that is populated with data which can correlate permanent resource provider identifiers (e.g., permanent merchant identifiers) to other data such as resource provider URLs (merchant URLs). The global resource provider repository may be in the form of a database. In this embodiment, the initial resource provider identifier can be a merchant URL, and the processing system 112 may use the global merchant repository to locate the permanent resource provider identifier corresponding to the resource provider URL.

The token service computer 106 can check to see if the initial or permanent resource provider identifier is already linked to a token, or if a temporary link needs to be established. In the former scenario, the token service computer may have previously linked the token, the token reference identifier, and the permanent resource provider identifier due to a prior transaction conducted with the resource provider identified by the permanent resource provider identifier. In the latter scenario, the token service computer 106 does not have any link between the initial or permanent resource provider identifier and the token. In this case, the token service computer 106 creates a temporary or permanent link between the token, the token reference identifier, and the resource provider identifier in the database. If the link is temporary, it may be valid for up to 24, 48, or 72 hours and the temporary link may be removed after that period of time.

The token service computer 106 can also generate a verification value for the token. The verification value may be generated for the current transaction or may be retrieved from storage. The verification value can be only three digits, such that it can fit within a pre-existing data field for a conventional CVV2 value on a checkout page.

Additional data may be stored and associated with the verification value. For example, the token service computer 106 can store domain restrictions for the token in a database. For example, the domain restriction may be that the token may only be used with the specific token requestor and/or with the specific resource provider that the user is currently interacting with. As noted above, in conventional systems, such data can be embedded in a cryptogram. However, such cryptograms can be significantly longer than three digits, so embodiments of the invention allow for the use of domain-restricting verification values with data fields for conventional data fields that can only contain a small number of characters or digits.

The token service computer 106 may associate the permanent resource provider identifier with the token, the token expiration date, the credential associated with the token, the verification value, and domain controls associated with the token in a database. The data for the token may also include other information such as time and date stamps as to when the token and the verification value were created, and which entity provided the domain controls.

In step S316, after the token service computer 106 determines the token and the verification value, the token service computer 106 can generate and transmit a token data response message comprising the at least the verification value to the token requestor 104. The token and the token expiration date may also be included in the token data response message if a token reference identifier was previously stored at the token requestor instead of the token. After receiving the token data response message, the token requestor 104 automatically form fills the verification value, the token, and the token expiration date into the data fields described above with respect to step S312.

After the data fields in the token requestor 104 are filled in with the token and the verification value, upon receiving the token data response message, the user 102 may confirm that the user wants to continue with the transaction. For example, the user 102 may provide confirmation by selecting a "submit" button on a checkout page on a resource provider website.

In step S318, the token requestor 104, can transmit the form filled host site page to the resource provider computer 120.

In step S319, the resource provider computer 120 may generate an authorization request message for the current transaction and can transmit it to the transport computer 114. The authorization request message may comprise at least the token, the verification value, the expiration date, and/or one or more data elements. If the authorization request message is for a payment transaction, it may also comprise a transaction amount.

The one or more data elements can be used to identify the permanent resource provider identifier for the resource provider operating the resource provider computer 120. For example, the one or more data elements could include the initial resource provider identifier, the permanent resource provider identifier, or data which can be used to determine the permanent resource provider identifier. For example, the one or more data elements may include any single element or combination of the following: a merchant ID, a merchant name, a store ID, a store name, a merchant street address, a merchant city, a merchant state, a merchant postal code, a merchant country code, a merchant URL, a doing business as (DBA) name, a business legal name, a payment a facilitator name, an enterprise name, a merchant category code, and a merchant category code description. In one example, the merchant name and the merchant's city and state may be in the authorization request message. This information may be used to determine a particular permanent merchant identifier. In another example, the one or more data elements could be merchant URL that is in the authorization request message. This merchant URL could itself be an example of a resource provider identifier.

In steps S319 and S320, the authorization request message is transmitted by the resource provider computer 120 to the transport computer 114, and from the transport computer 114 to, and is received by, the processing computer 110 of the processing system 112.

Upon receiving the authorization request message, the processing computer 110 communicates with the token service computer 106, and verifies that the token in the authorization request message is the same as the token provided to or assigned to the token requestor 104 in step S316. In this regard, the token service computer 106 and the processing computer 110 may exchange data on a per transaction, periodic or batch basis.

Once the token in the authorization request message is verified, the processing computer 110 or the token service computer 106 also determines or derive the permanent resource provider identifier using the one or more data elements in the authorization request message.

In some embodiments, the permanent resource provider identifier that is derived by the processing computer 110 or the token service computer 106 is compared against the permanent resource provider identifier previously stored by the token service computer 106. If there is a match, then the token service computer 106 can perform the additional processing described below.

Once the token service computer 106 determines the resource provider identifier, the token service computer 106 can determine if the verification value in the authorization request message matches the verification value that was created when the token was issued to the token requestor 104.

The token service computer 106 can also determine if there are any domain restrictions associated with the token and may evaluate the transaction characteristics with respect to those restrictions. For example, a domain restriction associated with the token and the verification value can be that the token can only be used with the resource provider which was previously identified by the permanent resource provider identifier. If the authorization request message was sent from a different resource provider than the one that we previously identified, then the authorization request message can be declined by the processing computer 110.

The token service computer 106 also exchanges the token for the real credential (e.g., a PAN) associated with the token. The processing computer 110 can then modify the authorization request message to include the real credential instead of the token.

In step S322, after the processing computer 110 and the token service computer 106 perform the above verification and validation processes, the authorization request message with the real credential and optionally data indicating the result of the verification and validation processes is sent from the processing system 112 to the authorizing entity computer 108. Upon receiving the authorization request message, the authorizing entity computer 108 may approve or reject the authorization request message. The authorizing entity computer 108 can then generate an authorization response message.

In step S324, the authorization response message is sent back to the processing system 112.

In step S325, upon receiving the authorization response message, the processing computer 110 determines whether to establish a permanent link between the resource provider and the token. The permanent link may be formed only if the permanent link doesn't already exist, the verification value is present and valid, and the authorization response message from the authorizing entity computer 108 is approved. If all the following conditions are met, the permanent link is formed between the resource provider identifier and the token in the processing computer 110. Any future transaction originating from that resource provider will be recognized by the processing system 112 including the token service computer 106 and the processing computer 110.

The processing computer 110 may also communicate with the token service computer 106 to obtain the token for the credential. The authorization response message may then be modified to include the token instead of the credential.

In step S326 and step S327, the authorization response message is sent from the processing system 112 to the transport computer 114, and from the transport computer 114 to the resource provider computer 120. In step S328, the resource provider computer 120 provides the transaction outcome to the token requestor 104.

In step S330, the payment outcome, or the outcome of the authorization response message, is shown to the user 102.

At a later date or time, a clearing and settlement process may take place between the transport computer 114 operated by an acquirer associated with the resource provider, network processing computer 110 and the authorizing entity computer 108.

Figure 4:
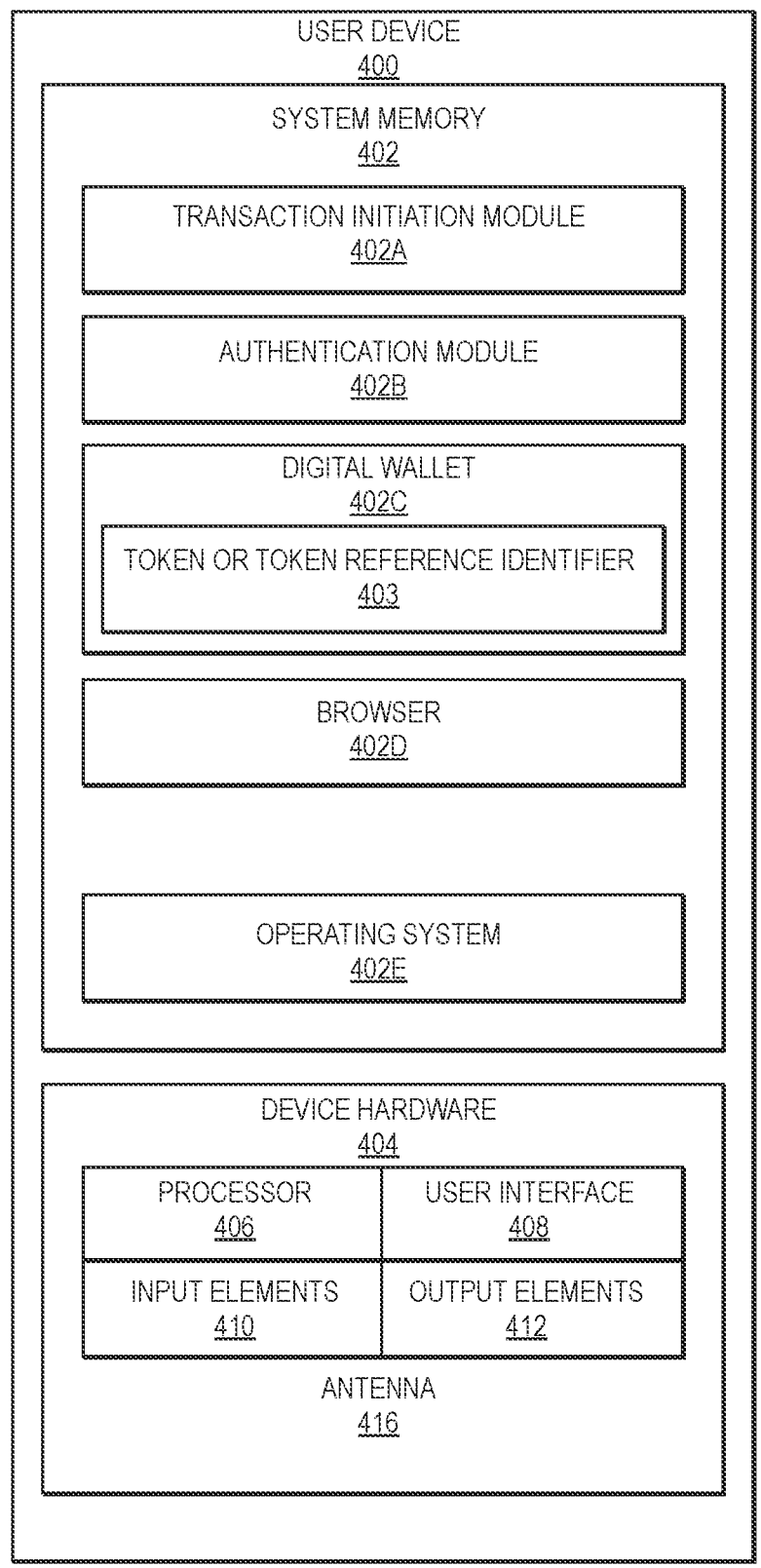
FIG. 4 shows a block diagram of an exemplary user device.

FIG. 4 illustrates a user device 400 according to an embodiment. User device 400 may include device hardware 404 coupled to a system memory 402. The user device 400 may be a mobile device, tablet, laptop, or any electronic devices that has the features of device hardware 404 along with the system memory 402.

Device hardware 404 may include a processor 406, an antenna 416, input elements 410, a user interface 408, and output elements 412 (which may be part of the user interface 408). Examples of input elements may include microphones, keypads, touchscreens, sensors, etc. Examples of output elements may include speakers, display screens, and tactile devices.

The antenna 416 may include one or more RF transceivers and/or connectors that can be used by user device 400 to communicate with other devices and/or to connect with external networks such as a remote cellular or data network. It may also be configured to communicate with external entities through a short range communication medium (e.g. using Bluetooth, Wi-Fi, infrared, NFC, etc.). The user interface 408 can include any combination of input and output elements to allow a user to interact with and invoke the functionalities of user device 400.

The system memory 402 can be implemented using any combination of any number of non-volatile memories (e.g., flash memory) and volatile memories (e.g. DRAM, SRAM), or any other non-transitory storage medium, or a combination thereof. The system memory 402 may store computer code, executable by the processor 406, for performing any of the functions described herein. For example, the memory 402 may store code, executable by the processor 406 to perform a method comprising: providing, by a token requestor to a processing system comprising a token service computer, a token data request message comprising an initial resource provider identifier associated with a resource provider, wherein the processing system determines a permanent resource provider identifier using the initial resource provider identifier and a verification value, and associates the permanent resource provider identifier with a token, the verification value, and domain controls associated with the token; receiving, by the token requestor from the processing system a token data response message comprising a verification value to the token requestor; and providing, by the processing system, the token and the verification value to a resource provider computer associated with the initial resource provider identifier, wherein the resource provider computer transmits an authorization request message for a transaction to the processing system, the authorization request message comprising the token, the verification value, and one or more data elements in a plurality of data fields, wherein the processing system determines the permanent resource provider identifier using the one or more data elements in the plurality of data fields, determines that the verification value in the authorization request message matches the verification value that was provided to the token requestor, and that the transaction satisfies the domain controls.

The system memory 402 may also store a transaction initiation module 402A, an authentication module 402B, a digital wallet 402C, a browser 402D, and an operating system 402E. The transaction initiation module 402A may include instructions or code initiating and conducting a transaction with an external device such as an access device or a resource provider computer. The authentication module 402B may comprise code, executable by the processor 406, to authenticate a user. This can be performed using user secrets (e.g., passwords, passcodes, patterns) or user biometrics (e.g., facial recognition, fingerprint).

System memory 402 may also store credentials and/or tokens in the digital wallet 402C. For example, the digital wallet 402C may contain a token or token reference identifier 403 to fetch the real tokens from an external computer such as a token service computer 500.

Figure 5:
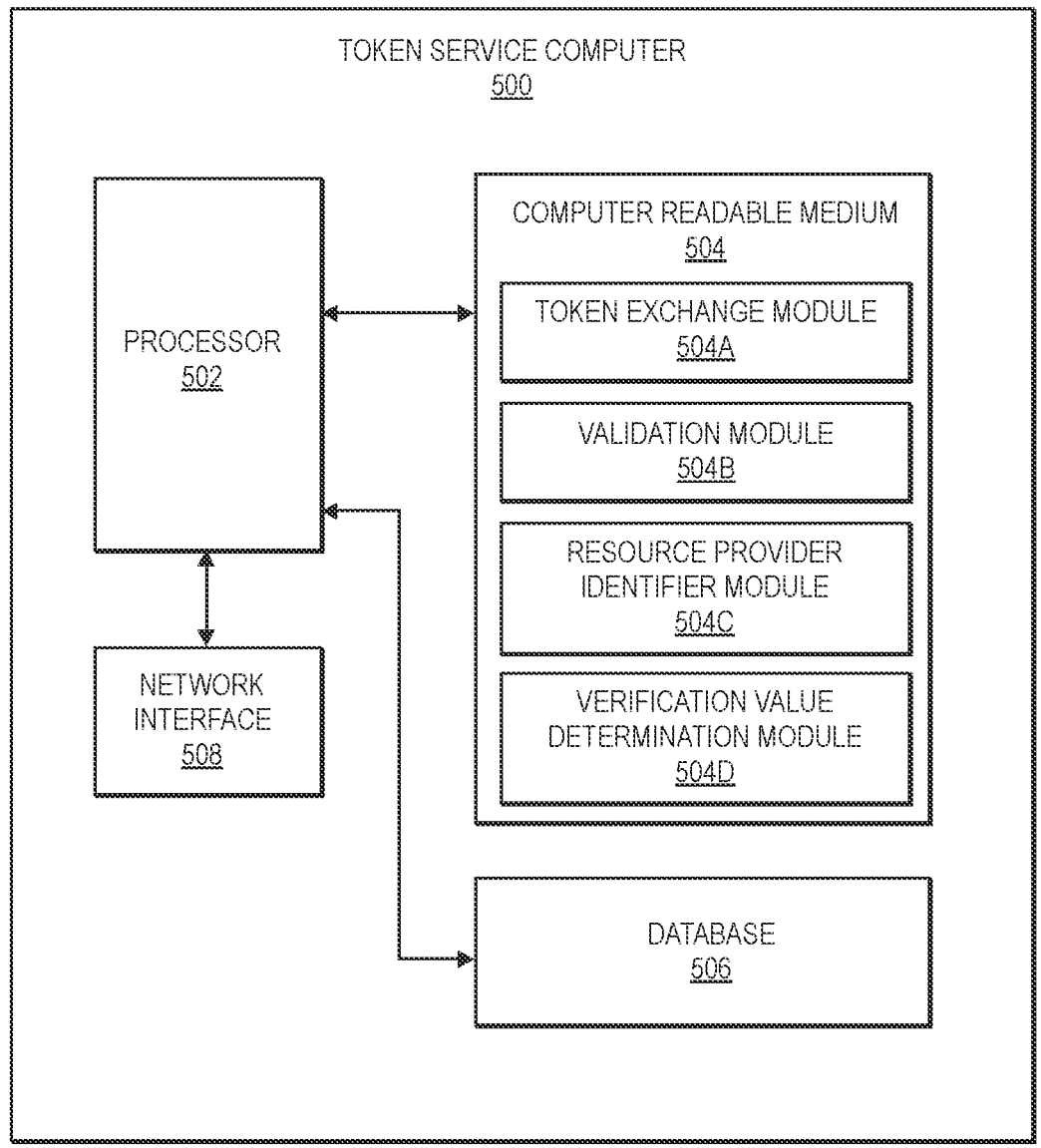
FIG. 5 shows a block diagram of an exemplary token service computer.

FIG. 5 shows a token service computer 500. The token service computer 500 includes a processor 502, a computer readable medium 504, a database 506, and a network interface 508 coupled to the processor 502.

The computer readable medium 504 may comprise a token exchange module 504A, validation module 504B, resource provider identifier module 504C, and verification value determination module 504D.

The token exchange module 504A may comprise code that causes the processor 502 to provision and access tokens. For example, the token exchange module 504A may contain logic that causes the processor 502 to provision a payment token and/or associate the payment token with a set of payment credentials. A token record may then be stored in a token record database indicating that the payment token is associated with a certain set of payment credentials.

The validation module 504B may comprise code that causes the processor 502 to validate token requests before a payment token is provided. For example, validation module 504B may contain logic that causes the processor 502 to confirm that a token data request message is authentic by confirming that the payment credentials are authentic and associated with the requesting device, and by assessing risk associated with the requesting. If the payment credentials, such as a merchant information, is not recognized by the token service computer and deemed risky, then the validation module 504B may reject the token request.

The resource provider identifier module 504C may comprise code that finds a resource provider identifier using an initial resource provider identifier. In some embodiments, the resource provider identifier module 504C and the processor 502 searches through the database 506, which may have a global merchant repository, to determine a permanent resource provider identifier. In other embodiments, the resource provider identifier module 504C and the processor 502 may generate a permanent resource provider identifier after receiving an initial resource provider identifier. In yet other embodiments, the resource provider identifier module 504C and the processor 502 can determine that the initial resource provider identifier is the permanent resource provider identifier.

The verification value determination module 504D, in conjunction with the processor 502, can determine a verification value. The verification value can be a random number, or a cryptogram, or a derived number. In some embodiments, the verification value can be generated, and in other embodiments, it may be selected from a pool of verification values.

The database 506 may store tokens and their associated credentials. The database 506 may also store initial and permanent resource provider identifiers, domain restrictions, timestamps, user device data, and other information associated with the tokens.

Figure 6:
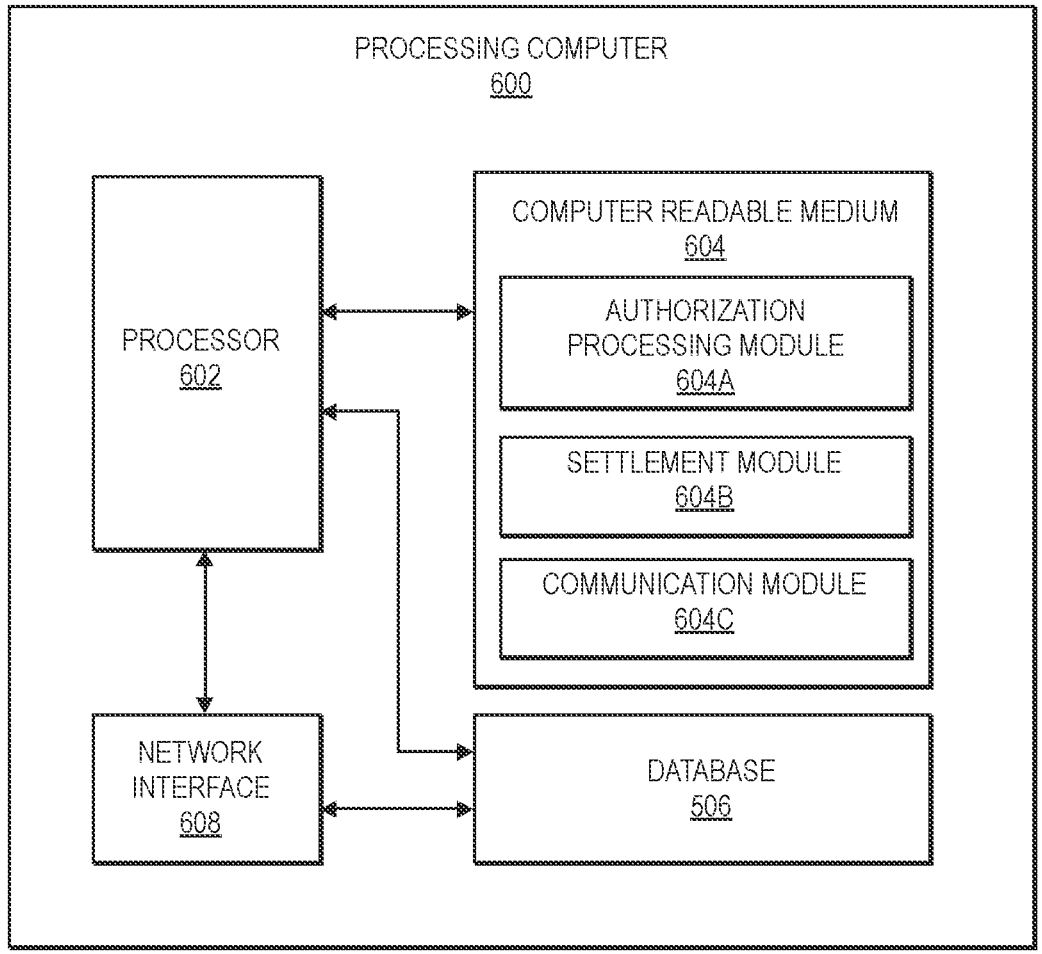
FIG. 6 shows a block diagram of an exemplary processing computer.

FIG. 6 shows a block diagram of a processing computer 600 according to an embodiment. The processing computer 600 may comprise a processor 602, which may be coupled to a computer readable medium 604, data storage 606, and a network interface 608.

The computer readable medium 604 may comprise a number of software modules including an authorization processing module 604A, a settlement module 604B, and a communication module 604C.

The authorization processing module 604A may comprise code that can cause the processor 602 to evaluate authorization request messages for transactions and determine if the transactions should be authorized. The authorization processing module 604A may also include code for routing or modifying authorization request and response messages as they pass between various parties such as authorizing entity computers (e.g., issuer computers) and transport computers (e.g., acquirer computers).

The settlement module 604B may comprise code that can cause the processor 602 to clear and settle transactions between various entities.

The communication module 604C may comprise code that causes the processor 602 to generate messages, forward messages, reformat messages, and/or otherwise communicate with other entities (e.g., with the token service computer).

Figure 7:
FIGS. 7, 8A, 8B, 9A, and 9B show exemplary screenshots of user interfaces that can be used in embodiments of the invention.

FIG. 7 shows a checkout page 700, where a user or a browser has already entered contact information and shipping information into the checkout page 700. Upon clicking one of the data fields of a payment method section 702, the user device is able to automatically provide a list of several accounts.

Figure 8A:
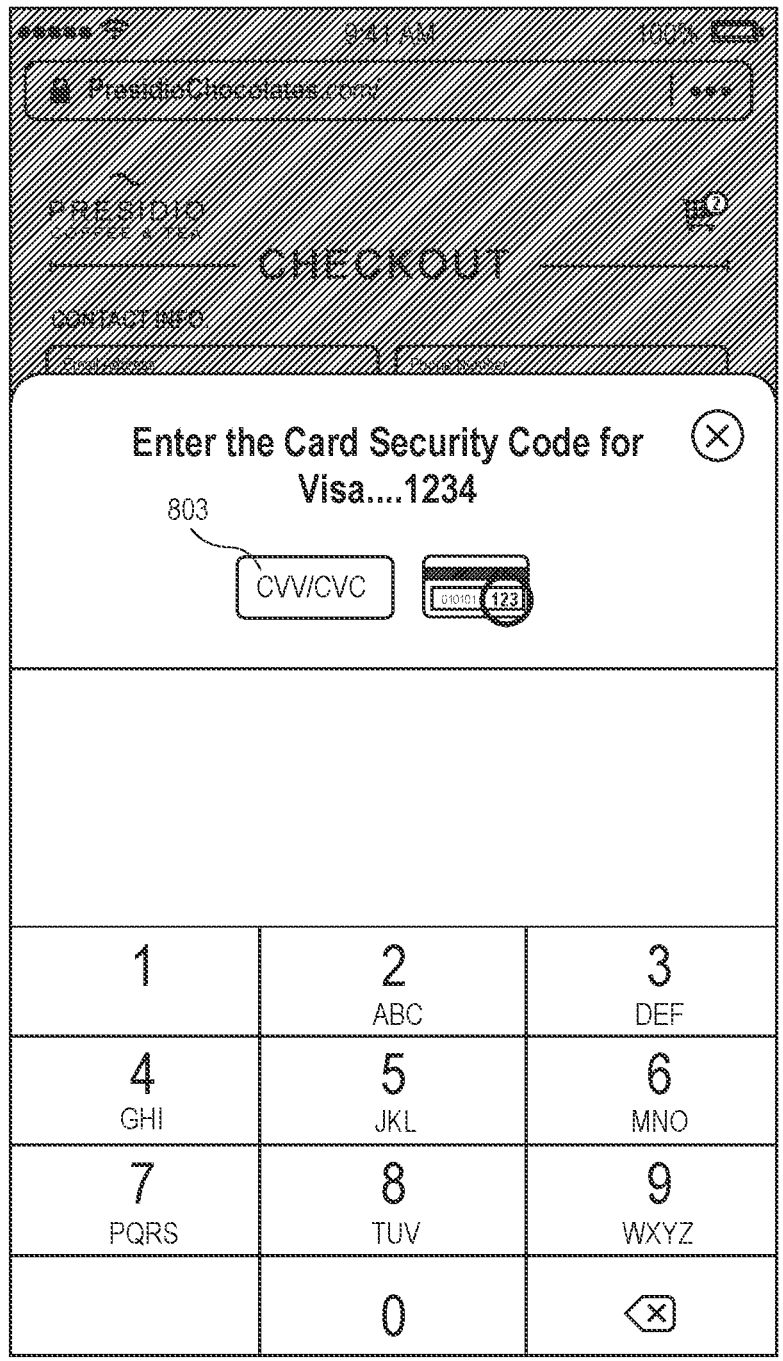
Figure 8B:
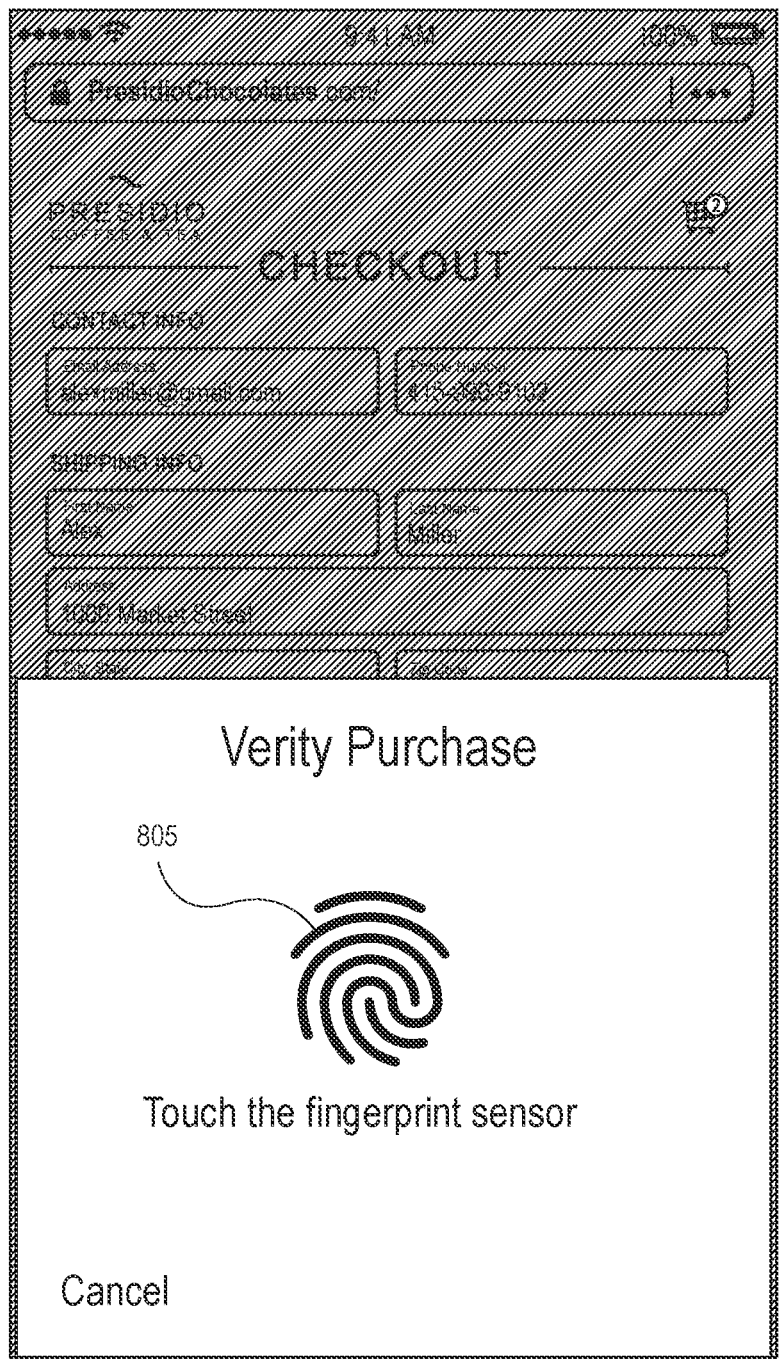

Upon selecting an account 704, the user is presented with the user interface as shown in FIG. 8A. FIG. 8A shows a page with a CVV2 data field 803. Instead of manually entering the CVV2 value into the CVV2 data field 803, the user may be shown the page in FIG. 8B, in which the user may be requested to provide authentication data such as a fingerprint.

Figure 9A:
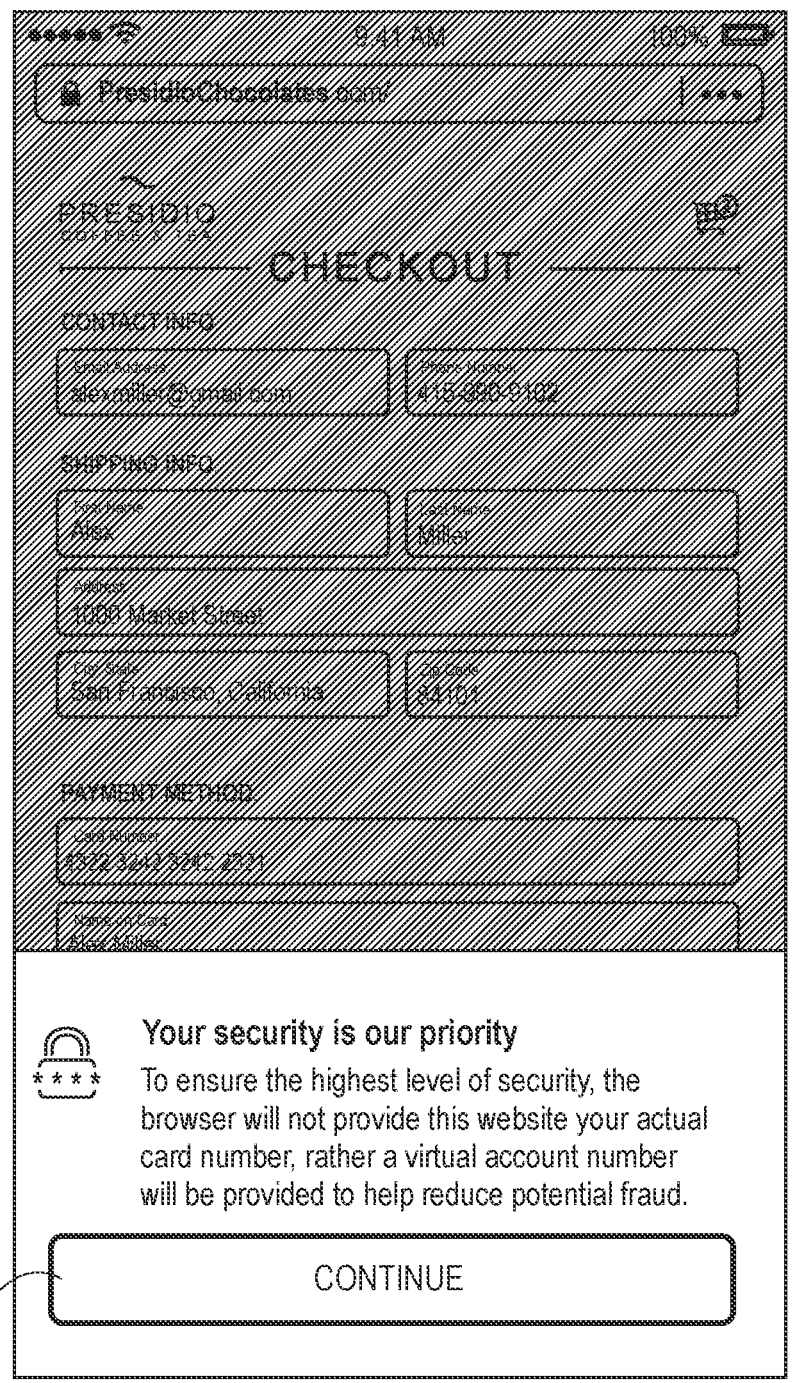
Figure 9B:
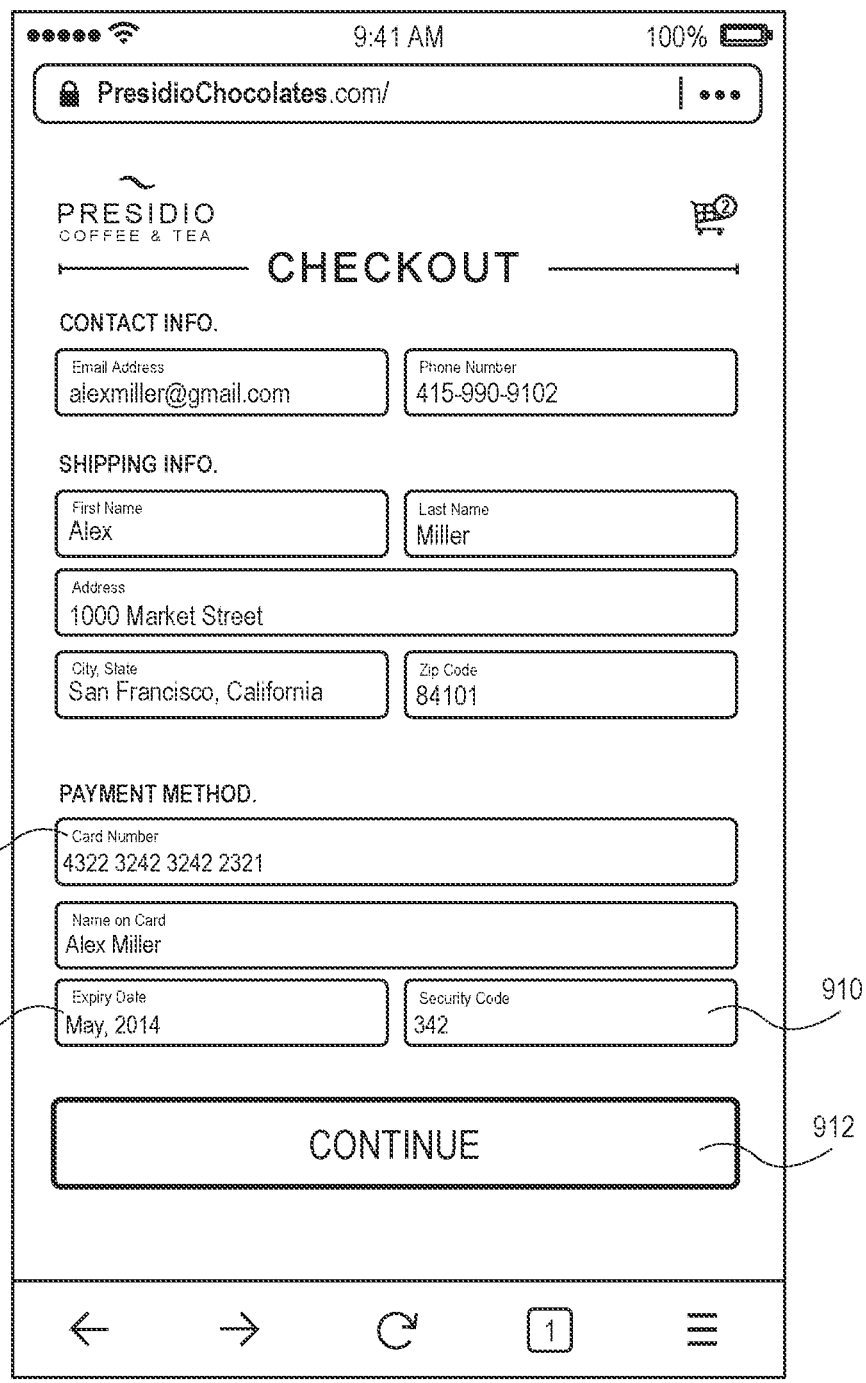

FIG. 9A shows a page which informs the user that a virtual number is being used to conduct the transaction instead of a real account number. Upon clicking continue button 902, the user is presented with a filled in checkout page as shown in FIG. 9B. In the checkout page, the card number, expiration date, and the security code are filled with token details. The card number 906 is replaced with the token number, the expiration date 908 is replaced with the token expiry date, and the security code 910 is replaced with a verification value (as described above).

Upon clicking a continue button 912 of the checkout page, the transaction continues and the authorization request message may be generated by the resource provider computer as described above.

Embodiments of the invention have a number of advantages. Embodiments of the invention can enforce domain restrictions on tokens, even though a resource provider may not have previously registered with a token service provider. Further, the resource provider does not need to program its resource provider computer in a special way to obtain the benefit of domain restrictions. A resource provider host site can use conventional data fields to receive data, while still obtaining the benefits of domain restrictions and token security. Still further, embodiments of the invention can allow many different merchants be linked to the same credential or token, thus dispensing with the need to issue resource provider specific tokens for every resource provider.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, at a processing system comprising a token service computer from a token requestor, a token data request message comprising an initial resource provider identifier associated with a resource provider operating a resource provider computer;
   determining, by the processing system, a permanent resource provider identifier using the initial resource provider identifier;
   responsive to determining the permanent resource provider identifier, determining, by the processing system, a verification value;
   associating, by the processing system, the permanent resource provider identifier with a token, and the verification value;
   providing, by the processing system, a token data response message comprising the verification value to the token requestor;
   receiving, by the processing system, an authorization request message for a transaction, the authorization request message comprising the token, the verification value, and one or more data elements in a plurality of data fields;
   determining, by the processing system, the permanent resource provider identifier using the one or more data elements in the plurality of data fields;
   determining, by the processing system, that the verification value in the authorization request message matches the verification value that was provided to the token requestor; and
   transmitting, by the processing system, an authorization response message to the resource provider computer.

2. The method of claim 1, wherein the initial resource provider identifier is a resource provider URL.

3. The method of claim 1, wherein the initial resource provider identifier is also the permanent resource provider identifier.

4. The method of claim 1, wherein the token requestor is a browser on a user device.

5. The method of claim 1, wherein the token data request message further comprises the token.

6. The method of claim 1, wherein the verification value is exactly three digits.

7. The method of claim 1, further comprising:
   before the authorization request message is received by the processing system, temporarily linking, by the processing system, the permanent resource provider identifier, the initial resource provider identifier, and the token; and
   after the authorization response message is transmitted, permanently linking, by the processing system, the permanent resource provider identifier, the initial resource provider identifier, and the token.

8. The method of claim 1, wherein the token data request message comprises a token reference identifier that is associated with the token, and the token data response message comprises the token.

9. The method of claim 1, comprising:
   transmitting the authorization request message to an authorizing entity computer for authorization.

10. The method of claim 9, wherein the authorizing entity computer generates the authorization response message after receiving the authorization request message, and wherein the method further comprises:
    receiving, by the processing system, the authorization response message from the authorizing entity computer; and
    transmitting, by the processing system, the authorization response message to the token requestor.

11. The method of claim 1, wherein the token requestor is a browser that interacts with a host site on the resource provider computer operated by the resource provider.

12. The method of claim 11, wherein the browser displays a number of data fields of fixed size, and wherein the verification value is automatically filled into one of the data fields.

13. The method of claim 1, wherein the token requestor is a browser on a user device, and wherein the token data request message further comprises a user device identifier for the user device, and wherein the processing system validates the user device identifier before providing the verification value.

14. The method of claim 1, wherein the verification value is valid for only one transaction.

15. A processing system comprising:
one or more processors; and
one or more non-transitory computer readable media, comprising code, executable by the one or more processors, to implement a method comprising:
receiving, from a token requestor, a token data request message comprising an initial resource provider identifier associated with a resource provider;
determining a permanent resource provider identifier using the initial resource provider identifier;
responsive to determining the permanent resource provider identifier, determining a verification value;
associating the permanent resource provider identifier with a token, and the verification value;
providing a token data response message comprising the verification value to the token requestor;
receiving an authorization request message for a transaction, the authorization request message comprising the token, the verification value, and one or more data elements in a plurality of data fields;
determining the permanent resource provider identifier using the one or more data elements in the plurality of data fields;
determining that the verification value in the authorization request message matches the verification value that was provided to the token requestor; and
transmitting an authorization response message to the token requestor.

16. The processing system of claim 15, wherein the processing system comprises a token service computer and a processing computer.

17. The processing system of claim 16, wherein the initial resource provider identifier is a URL, and the one or more data elements comprises the URL.

18. A method comprising:
providing, by a token requestor to a processing system comprising a token service computer, a token data request message comprising an initial resource provider identifier associated with a resource provider, wherein the processing system determines a permanent resource provider identifier using the initial resource provider identifier and a verification value, and associates the permanent resource provider identifier with a token, and the verification value;
receiving, by the token requestor from the processing system a token data response message comprising the verification value to the token requestor; and
providing, by the processing system, the token and the verification value to a resource provider computer associated with the initial resource provider identifier, wherein the resource provider computer transmits an authorization request message for a transaction to the processing system, the authorization request message comprising the token, the verification value, and one or more data elements in a plurality of data fields, wherein the processing system determines the permanent resource provider identifier using the one or more data elements in the plurality of data fields, determines that the verification value in the authorization request message matches the verification value that was provided to the token requestor.

19. The method of claim 18, wherein the token requestor is a browser on a user device.

20. The method of claim 19, wherein the user device is a mobile phone.

* * * * *